United States Patent [19]
Finch et al.

[11] Patent Number: 5,805,796
[45] Date of Patent: Sep. 8, 1998

[54] SYSTEM ARCHITECTURE FOR IMPLEMENTING MODULAR DIAGNOSTICS

[75] Inventors: Richard W. Finch; Roderick W. Stone, both of Austin, Tex.

[73] Assignee: Dell USA, LP, Austin, Tex.

[21] Appl. No.: 622,771

[22] Filed: Mar. 27, 1996

[51] Int. Cl.$^6$ ................................................. G06F 11/00
[52] U.S. Cl. ............................ 395/183.16; 395/837
[58] Field of Search .................. 395/183.13, 183.14, 395/183.01, 183.16, 680, 683, 685, 681, 701, 704, 710, 682, 832

[56] References Cited

U.S. PATENT DOCUMENTS

| | | | |
|---|---|---|---|
| 5,151,987 | 9/1992 | Abraham et al. | 395/575 |
| 5,181,162 | 1/1993 | Smith et al. | 364/419 |
| 5,390,325 | 2/1995 | Miller | 395/183.14 |
| 5,404,534 | 4/1995 | Foss et al. | 395/700 |
| 5,546,595 | 8/1996 | Norman et al. | 395/800 |
| 5,555,201 | 9/1996 | Dangelo et al. | 395/489 |
| 5,590,330 | 12/1996 | Coskun et al. | 395/704 |
| 5,606,661 | 2/1997 | Wear et al. | 395/183.14 |
| 5,608,720 | 3/1997 | Biegel et al. | 370/249 |
| 5,615,333 | 3/1997 | Juettner et al. | 395/183.14 |
| 5,615,400 | 3/1997 | Cowsar et al. | 395/685 |
| 5,619,710 | 4/1997 | Travis, Jr. et al. | 395/800 |
| 5,623,418 | 4/1997 | Rostoker et al. | 395/489 |
| 5,630,101 | 5/1997 | Sieffert | 395/500 |

OTHER PUBLICATIONS

McGarvey, "Object Oriented Test Development in Abbet", Autotestcon, IEEE, pp. 243–255, 1994.

Cobb et al., "A Generalized Object Oriented Diagnostic Model", Southeastcon, IEEE, pp. 755–758, 1991.

Pratapneni et al., "Development of Chip Model Library for the Computer Aided Analysis of Electronic Packages", Electronic Man. 15th Int'l. Symposium, IEEE, pp. 417–422, 1993.

Daponte et al., "Virtual Laboratory: An Object Oriented Framework", Advanced Technologies in I & M, IEEE, pp. 11–16, 1994.

Thompson et al., "Abbett Architecture Baseline for Test Systems of Teh Future", Autotestcon, IEEE, pp. 41–50, 1995.

*Primary Examiner*—Joseph Palys
*Attorney, Agent, or Firm*—Skjerven, Morrill, MacPherson, Franklin & Friel LLP; Ken J. Koestner

[57] ABSTRACT

A software system and corresponding method of operation represents physical devices as software objects that are derived from a generic base class. A diagnostic system operating on a processor includes a base class operating on the processor, a physical device connected to the processor and a diagnostic device object derived from the base class and having an encapsulated device characteristic definition corresponding to physical characteristics of the physical device so that the diagnostic device object is associated with the device. The base class is a generic class that serves as a template for other classes. A method of performing a diagnostic operation relating to a physical device in a computing system includes the steps of creating a generic base class, deriving a software object from a generic base class and representing the physical device as the derived software object.

23 Claims, 8 Drawing Sheets

SYSTEM ARCHITECTURE FOR IMPLEMENTING MODULAR DIAGNOSTICS

BACKGROUND OF THE INVENTION

1. Field of the Invention

The present invention relates to diagnostic systems within a computer. More specifically, the present invention relates to a software system in an object-oriented environment for performing diagnostic operations applied to multiple various hardware devices and components.

2. Description of the Related Art

In a typical computer system, many different software modules must cooperate to convert user and application requests to specific hardware operations. A software system operating on a computer that effectively supports a wide range of physical devices, including electronic, mechanical and magnetic devices, is highly advantageous. However, achieving broad support for hardware devices is very difficult since a multitude of manufacturers and vendors of such hardware equipment typically supply software modules that must operate within the software system without causing failure in any form.

Computer systems have evolved to support a wide variety of system configurations. A nonexhaustive list of computer system configurations includes standalone computers, personal computers, workstations, multimedia systems, networked personal computer systems, network server systems, multiprocessor systems, embedded systems, integrated telephony systems, video conferencing systems and the like. The different varieties of computer systems are distinguished by hardware components that are attached to one or more processors within the computer system and also by software which operates on the processor and drives the various hardware components.

Hardware component differences in the various types of computer systems are distinguished by choice of bus configurations, memory hierarchies and cache configurations, I/O interfaces, controllers, devices, and peripheral components. For example, suitable configurations of a computer system include combinations of display and performance components, cards, interfaces, and devices such as video display devices, monitors, flat-panel displays, touch screens, pointing devices and keyboards video cards and devices, 2-D and 3-D graphics cards, frame buffers, MPEG/JPEG compression/decompression logic and devices, videoconferencing cards and devices, video cameras and frame capture devices, computer integrated telephony cards and devices, modem cards and devices, fax cards and devices, sound cards and devices, audio and video input devices, microphones, and speakers, data acquisition and control cards and interfaces, compression/decompression logic and devices, encryption/decryption logic and devices. Other various hardware components are storage components including secondary and tertiary storage devices, controllers, and interfaces, caches, RAM, ROM, flash memory, static RAM, dynamic RAM, tape backup units, redundant/fault tolerant components and devices such as RAID and ECC memory, CD-ROMs, fixed disks, removable media storage devices, floppy disks, WORMs, IDE controllers, enhanced-IDE controllers, SCSI devices, scanners and jukeboxes. Additional various hardware components and devices include bus, interface and communication systems such as PCMCIA interfaces and devices, UARTs, ISA busses and devices, EISA busses and devices, PCI local busses and devices, VESA local busses and devices, Micro Channel Architecture busses and devices, network interfaces, adapters and cards such as for ethernet, token ring, 10Base-T, twisted pairs, untwisted pairs, ATM networks, frame-relay, ISDN and the like. Furthermore, additional hardware configurations support multiple processors including coprocessors, floating point processors, graphics processors, I/O controllers, and the like.

This lengthy list of components and devices which are combined to form various exemplary computer systems is not exhaustive. Suitable combinations of components, cards, interfaces, and devices, including the devices listed previously, as well as comparable components, cards, interfaces, and devices), are too numerous to list.

The myriad components and devices that are incorporated into various computer systems are produced and distributed by numerous different manufacturers, vendors, and suppliers. The numerous components and devices are designed and modified over time and thus are constantly changing.

What is needed is a software system that is sufficiently adaptable, extendible and versatile to reliably handle multiple, highly diverse hardware components that are designed by a broad range of suppliers.

Diagnostic operations in conventional computer systems are controlled by representing physical devices and components using traditional control structures such as tables and static lists. Tables and static lists are difficult to develop and maintain since, as a computer system is expanded by adding new peripherals and components, the tables and static lists must be constantly updated and expanded to include the added peripherals and components. An additional complication is that the executive, or user interface, portion of the computer system must be designed to accommodate the specific structure of the hardware/software interface of each peripheral and component.

One type of conventional operating system-based diagnostic system is developed as a single executable file. Unfortunately, the load size of such a system is prohibitively large. Furthermore, the system employing a single executable file involves a substantial maintenance and testing burden because each instance in which a new device or component is added generates the need for software support for the new device including the changing and retesting of the executable file.

Another type of conventional operating system-based diagnostic system is developed as an executable file which incorporates a user interface that loads diagnostic modules. The conventional software systems are constructed in a modular form in which the system is decomposed into a set of cohesive and loosely coupled modules. Advantages are achieved by modular software design. A modular approach advantageously reduces load size and, because the inclusion of support for new hardware components and devices does not necessitate testing of the entire system, maintenance and testing are reduced.

However, the traditional method of developing modular diagnostics using tables and static lists involves modification of the user interface executable each time a new module is released, leading to a new release of the diagnostic system which, in turn, involves more testing. Furthermore, even modular and extensible designs are developed based on a preconceived specification of the components and devices that may be incorporated into the system. In a conventional modular system, a search for hardware components is only possible for prespecified hardware components and devices. A significant disadvantage of such conventional modular systems is that new components and devices substantially impact the basic structure of the software so that the executive must be updated to accommodate any modification or addition of hardware components. For large computer systems that are maintained by a distributed organization, coordination of changes is difficult.

In addition, the traditional modular diagnostic approach involves substantial duplication of program code since the diagnostic modules typically perform many common tasks, for example, enabling and disabling the cache, enabling and disabling interrupts and the like.

What is needed is a diagnostic architecture that supports new devices without modification of unrelated modules or the user interface executable. What is further needed is a diagnostic architecture that reduces maintenance and testing. Furthermore, in the software engineering fields, a fundamental need exists to simplify software development, thereby streamlining software design, cutting software development costs and eliminating error in a final software product.

SUMMARY OF THE INVENTION

In accordance with the present invention, a software system and corresponding method of operation represents physical devices as software objects that are derived from a generic base class. An object is a software entity including a function and data. The function performs an action and the data is used by the function to perform the action. Object-oriented technology provides for an object to be reused in different parts of a software system so that the software entity is used in the same manner as an engineered hardware product such as a standard type of resistor of microprocessor. Object-oriented technology better deploys and utilizes current and future resources.

A class is a set of objects that share a common structure and a common behavior. A base class is the most generalized class in a class structure. A generic base class is a base class that serves as a template for other classes, in which the template is parameterized by other classes, objects and operations. A generic class is instantiated by writing defining parameters to the template before objects can be created. Generic classes are typically used as container classes, classes having instances that are collections of other objects.

In accordance with one embodiment of the invention, a diagnostic system operating on a processor includes a base class operating on the processor, a physical device connected to the processor and a diagnostic device object derived from the base class and having an encapsulated device characteristic definition corresponding to physical characteristics of the physical device so that the diagnostic device object is associated with the device. The base class is a generic class that serves as a template for other classes. Encapsulation, which is also called "information hiding" is the process of hiding all of the details of an object that do not contribute to the essential characteristics of the object. Typically both the structure and implementation of the method of an object are hidden. Encapsulation is a fundamental element of the object model.

In accordance with another embodiment of the invention, a method of performing a diagnostic operation relating to a physical device in a computing system includes the steps of creating a generic base class, deriving a software object from a generic base class and representing the physical device as the derived software object.

Many advantages are achieved by the described system and method. One advantage is that modular diagnostics form a polymorphic interface, allowing the usage of a single interface for multiple different functions and environments. Another advantage is that modular diagnostics furnish pretested and fully debugged software components which are imported to a software system. A further advantage is that modular diagnostics fundamentally utilize substantial reusability of software, greatly increasing design productivity and reducing the occurrence of software failures. Reuse of software in the described diagnostic modules is highly advantageous for designing software components that mesh with other components that are constructed at other times and places. An additional advantage is that software modules are independent so that a module having a pointer to an object of a particular class has access to the functions within that class without having to be physically linked with the module that contains the implementation of the class. Another advantage is that communication is established between independent modules despite neither a parent process nor a child process having any program code made accessible by linking of the other module's class definition. One advantage of independent software modules is that multiple modules may be developed simultaneously with distributed and independent design and development. Maintenance is reduced by isolating software changes to a single independent module which eliminates updating of other modules. Testing is simplified since each module may be tested independently of other modules. Independence among modules improves reliability by avoiding unexpected interactions between functions of different modules. Another advantage is that software system is easily extensible. Code reuse is advantageously promoted using the object-oriented technique. A further advantage is that the system uses virtual function features that resolve addresses of functions at run time rather than at link time so that the software system is freely configurable to furnish a versatile functionality.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
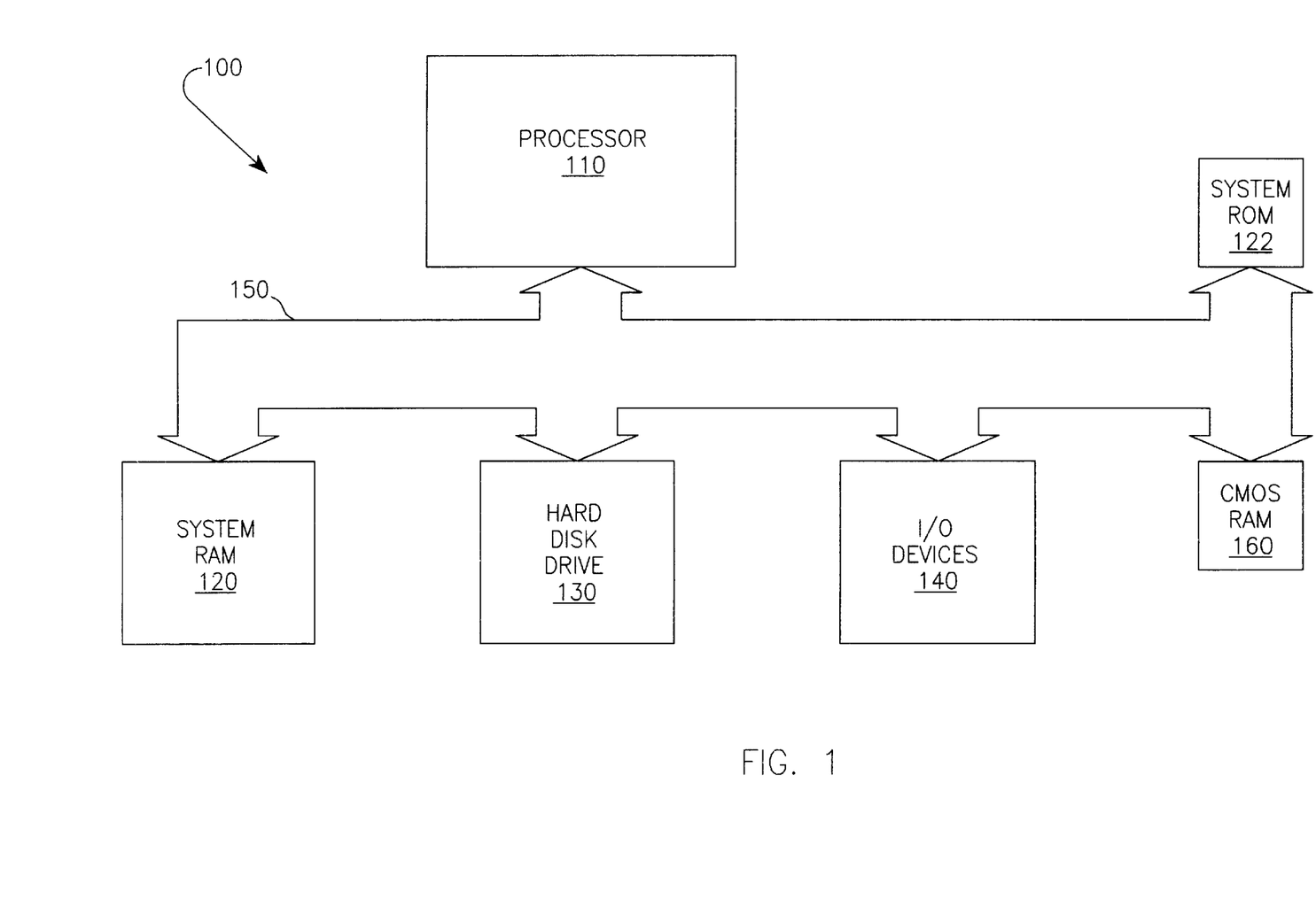
FIG. 1 is a block diagram which depicts computer system hardware upon which a software system for implementing an architecture for modular diagnostics in accordance with an embodiment of the present invention is implemented.

Referring to FIG. 1, a computer system 100 is shown which runs a system for creating an operating system independent environment for executing utility programs. The computer system 100, typically a personal computer, includes a processor 110, a system random access memory (RAM) 120, a system ROM 122, a hard disk drive 130 and various other input/output devices 140. These system components communicate via a bus 150 which includes data, address and control lines. A CMOS clock nonvolatile RAM 160, which is connected to the processor 110 via the bus 150, is typically utilized to store information even when power to the computer system 100 is interrupted. Program instructions that make up the system for creating an operating system independent environment are stored in a storage device such as the hard disk drive 130 or the system ROM 122 connected to the processor 110. The processor 110, for example an x86 processor such as a 486, Pentium™ or Pentium Pro™ processor, executes the computing operations of the computer system 100.

Figure 2:
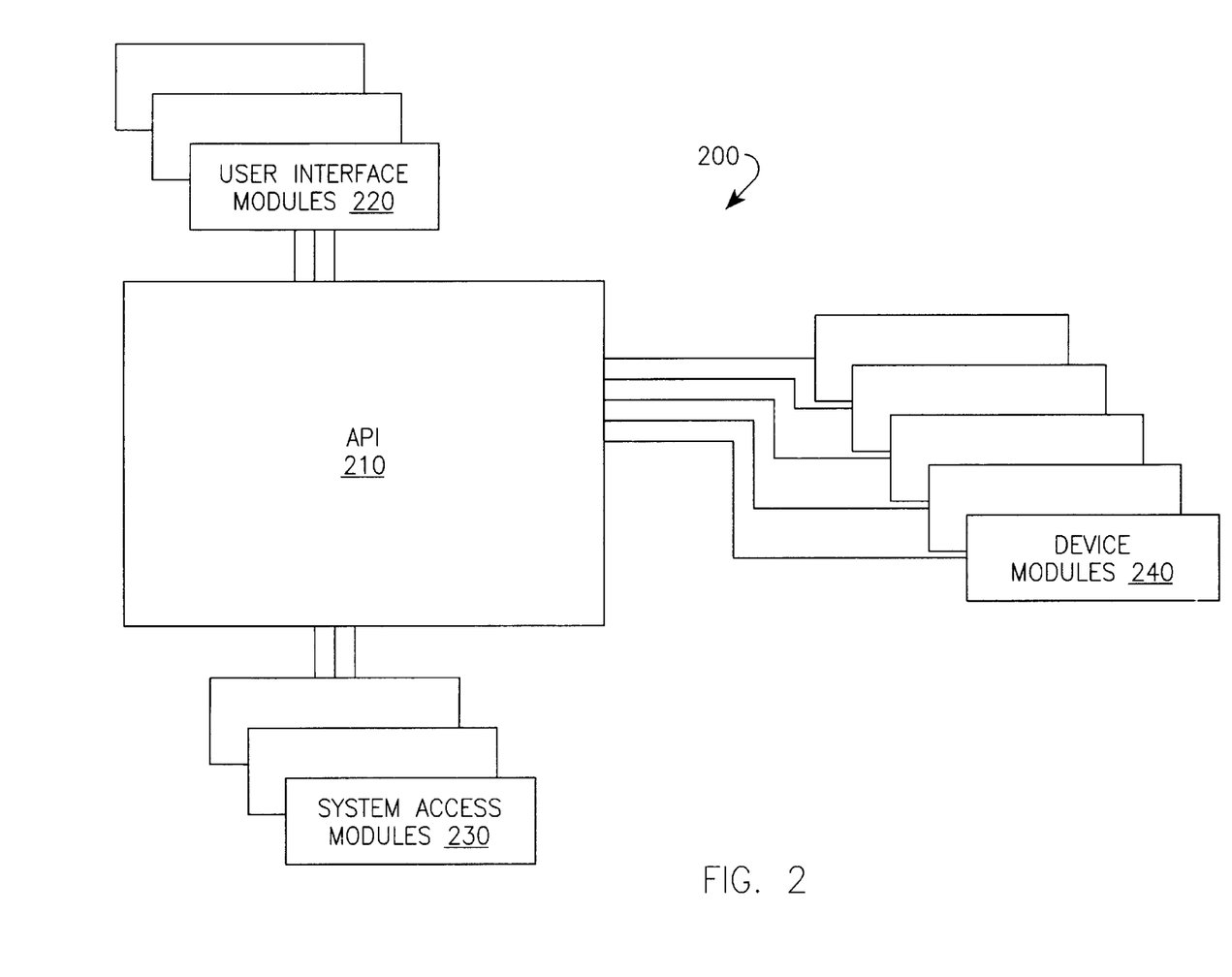
FIG. 2 is a block diagram which shows a software system for implementing an architecture for modular diagnostics in accordance with an embodiment of the present invention.

Referring to FIG. 2, a block diagram shows a software system 200 for implementing an architecture for modular diagnostics. The software system 200 typically includes a controlling application programming interface (API) 210, a plurality of user interface modules 220, a plurality of system access modules 230 and a plurality of device modules 240. In various embodiments, the software system 200 may include one or several of the user interface modules 220, a plurality of system access modules 230 and a plurality of device modules 240, or may not include any of one or more of the particular module types. The controlling API 210 includes a defined set of functions that are furnished by the software system 200 or used by an application. A user interface module 220 includes interface software for communicating information between the controlling API 210 and a system user. A system access module 230 is a hardware-level system-specific hardware device driver software module. A device module 240 is a hardware-level generic-type hardware device driver software module.

Figure 3:
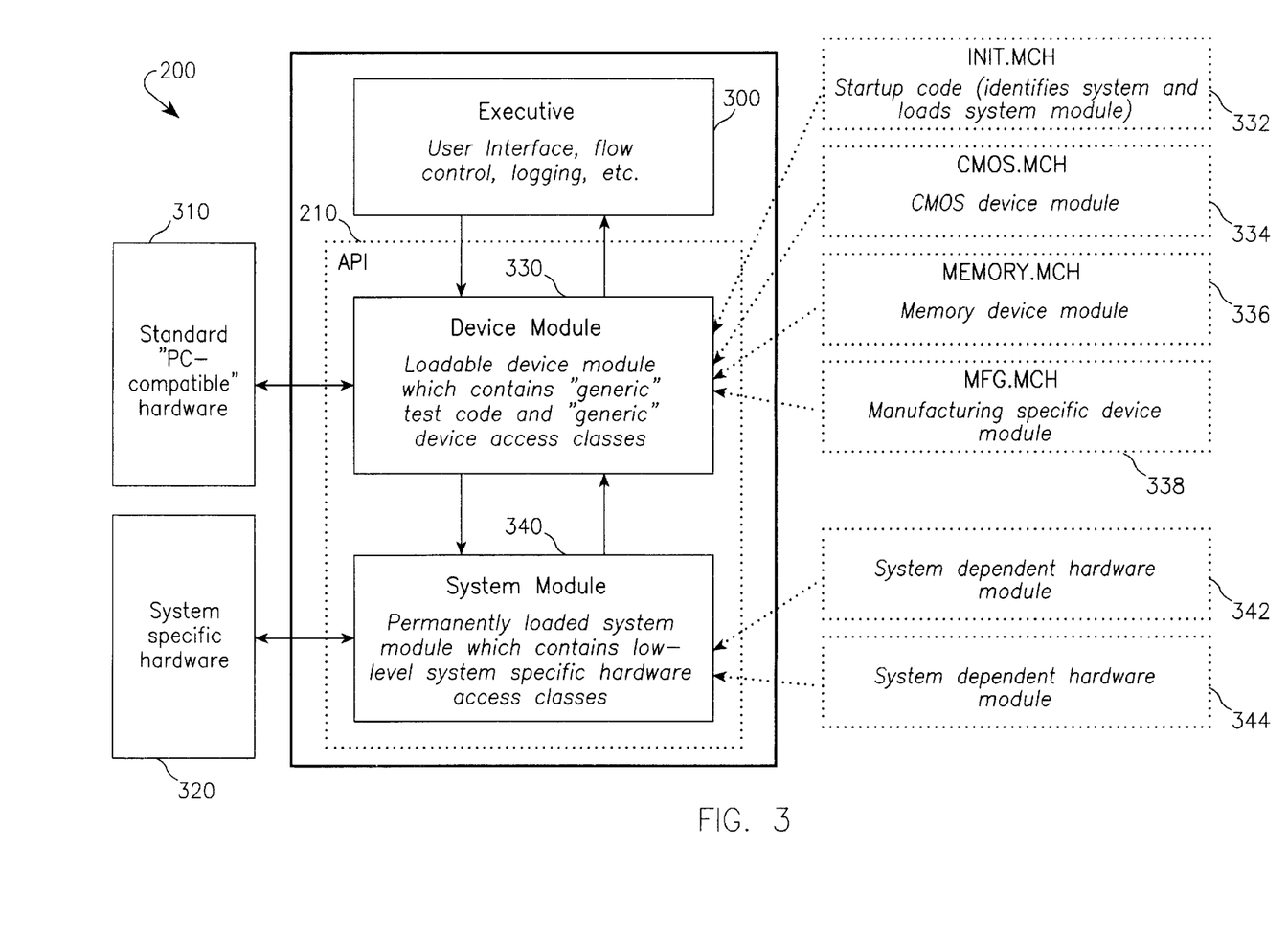
FIG. 3 is a block diagram which depicts the software system and interconnections with computer system hardware.

Referring to FIG. 3, a block diagram shows the software system 200 interconnections with computer system hardware. In particular, the software system 200 includes an interface to one or more hardware components in the groups of standard "PC-compatible" hardware 310 and system-specific hardware 320. The software system 200 includes an executive 300, a master software program that controls the execution of other software modules in the controlling API 210. The controlling API 210 includes device modules 330 and system modules 340. The executive 300 is a software program that controls various functions such as user interface control, flow control, data logging and the like.

The device modules 330 are loadable device modules that contain generic-type test programs and generic-type device access classes. Examples of device modules 330 are an initialization module 332 using initialization program code for identifying a software system and loading a system software module and a CMOS device module 334 for controlling a CMOS memory holding system configuration information in nonvolatile memory. Other examples of device modules 330 are a memory module 336 for controlling a memory device and a hardware specific module 338 for controlling a manufacturing-specific device. The device modules 330 are connected to standard "PC-compatible" hardware 310.

Each device module 330 includes one instance of a device module structure. The device module structure includes a signature, a pointer to a startup code for the module, a pointer to an initialization function of the module, and a pointer to an exit function of the module, all of which are statically initialized at link time. The device module structure also includes a pointer to a module function for setting global flags, and a pointer to an executive base class object in the executive. The device module structure also includes an API version number, an index into a file table for the module, an initial value of the stack segment of the module, an initial value of the module stack pointer and a value of the stack limit of the executive. The API 210 loads the device module 330 into a storage, such as a memory, and locates the device module structure by scanning for the signature at the beginning of the device module structure. Once the device module structure is located, the API 210 initializes the pointer to the executive base class object in the executive 300 to point to the single instance of the executive class. Next, the API 210 initializes the index into the file table for the device module 330 to indicate the file table element associated with the device module 330. The API 210 initializes the stack segment and stack pointer to initial values that enable the "main" function of the device module 330 to return to the API 210 and then executes the startup code in the device module 330 using the initialized startup pointer in the device module structure. The API 210 then calls the module initialization function using the pointer to the device module initialization function, enabling the device module 330 to detect any devices supported by the device module 330 and instantiate device class objects for the devices. The API 210 calls the module exit function each time the device module 330 is to be unloaded from memory so that various miscellaneous cleanup operations are performed. Cleanup operations include closing of files, flushing of buffers and the like. The device module exit function executes exit code and returns control to the API 210.

The system modules 340 are permanently loaded device modules that contain hardware-level system-specific hardware access classes. A system module is loaded using a system module loading function that loads a specified system module file into memory. A system module file is a module containing system-specific access classes and is loaded into memory where the file remains resident. Device modules 330 access the system specific access classes via the API 210. The system module loading function first finds the specified system module file, calculates the amount of memory capacity to load the module file, and calculates the load size for the file. The loading function allocates memory for loading the system module, sets up a far pointer to a parameter block that is accessed by the system module, and loads the module into memory. In one embodiment, the module is loaded into memory by executing an int 21h function. The loading function checks the loaded system module for the existence and validity of various data structures such as an ID string, API version number, and various suitable data and information pointers. The system module loading function also initializes and sets various control parameters including local variables set to member variables and setting of local variables to stack segment and stack pointer elements. The loading function save the stack segment and stack pointer of the executive on the module stack and restores registers.

Examples of system modules 340 are various system-dependent hardware modules 342 and 344. The system modules 340 are connected to system-specific hardware 320.

Each system module 340 includes one instance of a system module structure. The system module structure includes a signature, a pointer to a startup code for the system module, a pointer to an initialization function of the system module, and a pointer to an exit function of the system module, all of which are statically initialized at link time. The system module structure also includes a pointer to a module function for setting global flags, and a pointer to an executive base class object in the executive. The system module structure also includes an API version number, an index into a file table for the module, an initial value of the stack segment of the system module, an initial value of the system module stack pointer and a value of the stack limit of the executive. The API 210 loads the system module 340 into memory and locates the system module structure by scanning for the signature at the beginning of the system module structure. Once the system module structure is located, the API 210 initializes the pointer to the executive base class object in the executive 300 to point to the single instance of the executive class. Next, the API 210 initializes the stack segment and stack pointer to initial values that enable the "main" function of the system module 340 to return to the API 210 and then executes the startup code in the system module 340 using the initialized startup pointer in the system module structure. The API 210 then calls the module initialization function using the pointer to the system module initialization function. The API 210 calls the module exit function each time the system module 340 is to be unloaded from memory so that various miscellaneous cleanup operations are performed. Cleanup operations include closing of files, flushing of buffers and the like. The system module exit function executes exit code and returns control to the API 210.

Figure 4:
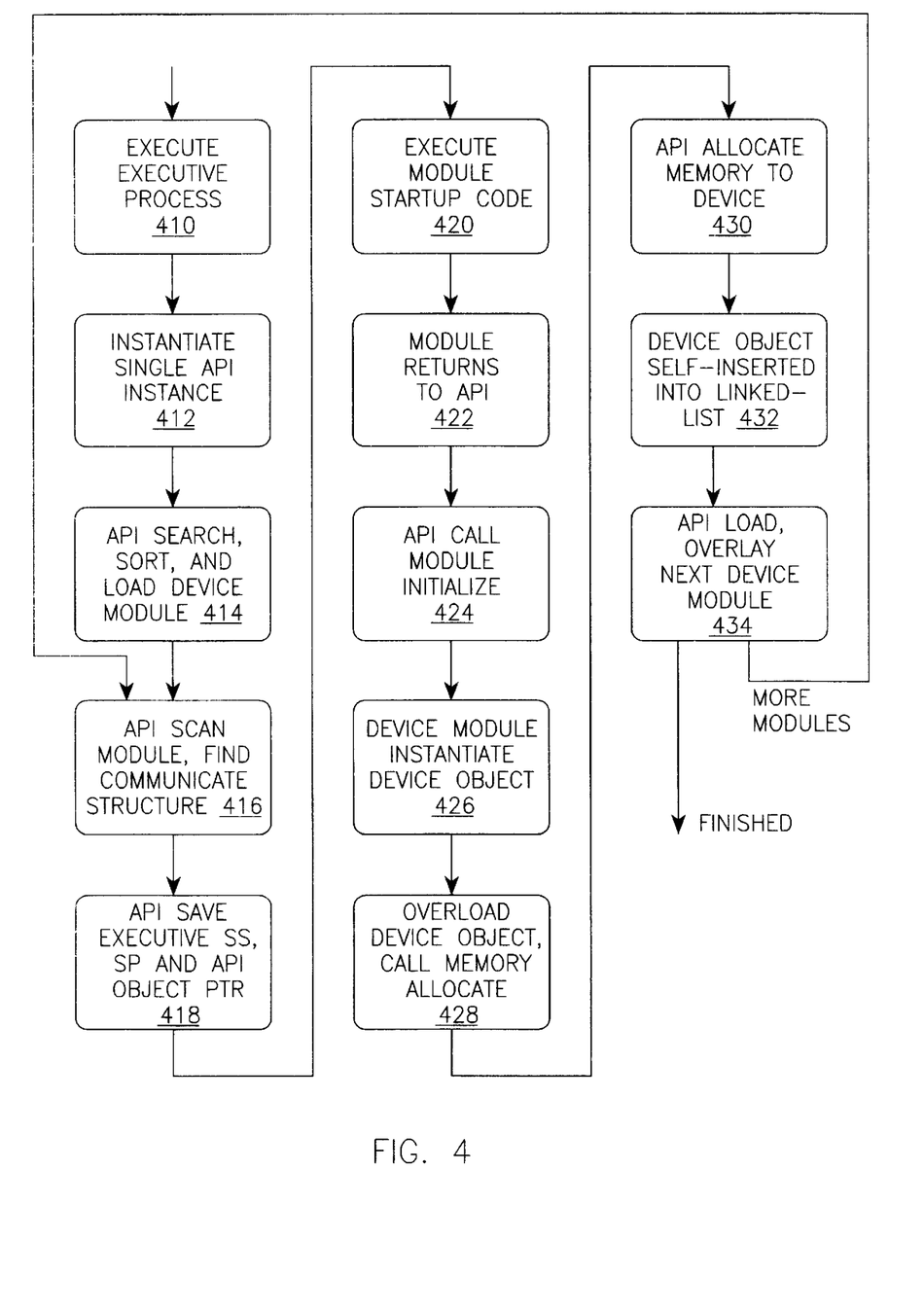
FIG. 4 is a flowchart which illustrates operations of the software system including operations that allocate classes and objects to modules and blocks within the physical design of the software system.

Referring to FIG. 4 in conjunction with FIG. 3, a flowchart illustrates operations of the software system 200 including operations that allocate classes and objects to modules and blocks within the physical design of the software system 200. In step 410, the software system 200 executes the executive 300. The executive 300, in step 412, operates on the controlling API 210 to instantiate a single instance of the API class. The executive 300 performs the instantiation function by writing information in a template of a generic or parameterized class, here the API class, to produce the API class from which instances are created. The controlling API 210 performs an API constructor operation. A constructor is an operation that creates an object, initializes the state of an object or both creates and initializes the object.

In step 414, the API constructor searches for all device modules, sorts the device modules, and then loads the first device module. The API constructor conducts the search for device modules using a dynamically-selected file mask to identify the files to be included in the search. The API constructor sorts a table of device module files prior to loading and initialization of the files. The API constructor sorts the list of files based on an overlay number of the files which is stored in an EXE header of a module and is initialized at make time. Using this technique, the order of loading the device module files is controlled. The API constructor allocates and initializes an array of file table structures with the file names and load sizes of all device modules that are found. The API constructor then loads each device module file and calls a device initialization function in the module. At the completion of the API constructor operation, a sorted linked list of all devices found by the API constructor exists in memory and is designated by a "first device" data pointer of an executive base class object. Typically, the searching, sorting and loading operations are achieved using any method or operating system function that allows far call operations. These methods and operating system functions are known in the computer software arts. One example of such a method or operating system function is an Execute Program (EXEC) DOS Interrupt 21h function 4Bh, subfunction 3, which uses the DOS overlay function to load a specified module file into memory.

In step 416, the API constructor operation of the controlling API 210 scans the first device module to find a communication structure. The communication structure is identified by a unique signature and checksum, which are previously set to predetermined values. In step 418, the API constructor operation of the controlling API 210 accesses the stack segment and pointer of the executive 300 and accesses a pointer to the API class object. The API construction operation then saves the stack segment and pointer of the executive 300 and the API class object pointer to the communication structure of the first device module. In different embodiments of the software system 200, various techniques are used to save stack pointers and furnish a pointer to a module. These techniques include usage of command line parameters, environmental variables, interrupt handlers and the like. These techniques are known in the computing arts.

In step 420, the API constructor executes the startup code of the device module. The startup code of the device module calls the main function of the device module in step 422. The device module main function returns to the API constructor using the stack segment and the pointer that were stored in the communication structure of the device module in step 418. The controlling API 210 then, in step 424, calls the initialization function of the device module using the pointer stored in the communication structure of the device module. The initiated device module produces a class, or class operator, from which further instances are created.

In step 426, the initialization function of the device module uses the class operator to instantiate a device class object. In step 428, the class operator for the device class is overloaded so that the class operator and other class operators in the device class have corresponding values and variables in accordance with the object programming concept of polymorphism. Thus, the various class operators in the device class may declare procedures and functions having the same names so long as the invocation of such procedures and functions are distinguishable by their corresponding parametric profiles, including the numbers and types of arguments and the types of values returned by the procedures and functions. In combination with overloading of the class operator, the class operator calls a memory allocation function in the controlling API 210 using the API class object pointer that is stored in the communications structure of the device module in step 418.

An API allocation function of the controlling API 210 allocates memory for the device object in step 430 and returns a pointer designating the allocated memory to the device module. In step 432, a device constructor of the device object inserts itself into a linked list of device objects belonging to the API class object. In step 434, the API constructor loads a next module, overlaying the current module in memory and branches to step 416 to repeat all of steps 416 through 432 for all modules.

When all modules are loaded and have instantiated device class objects, the API 210 includes a pointer to a linked list of all device class objects. The pointer and linked list establish a method for bi-directional communication between independent modules. This pointer empowers the API 210 to directly call any virtual member function of the device class simply by using a conventional function call so long as the module corresponding to the device object is reloaded into memory at the same location that the particular device object was originally loaded in step 414. In turn, the device module now has access to a pointer to the API class object, as stored in the communication structure in step 418. This pointer to the API class object enables a device module to directly call any virtual member function of the API class using a conventional function call. The API 210 and the device modules 330 are not mutually linked and may be created at different times. The communication between independent modules is established by compilation of both the API 210 and the device modules 330 with a header that defines the device and API classes.

The software system 200, in addition to having constructor functions for constructing devices, also includes a class destructor function that frees memory for all device names and device type names. The class destructor also frees memory for all device class objects, frees memory that is allocated by a module that is currently in memory, frees module memory and the file table and returns from execution.

Figure 5A:
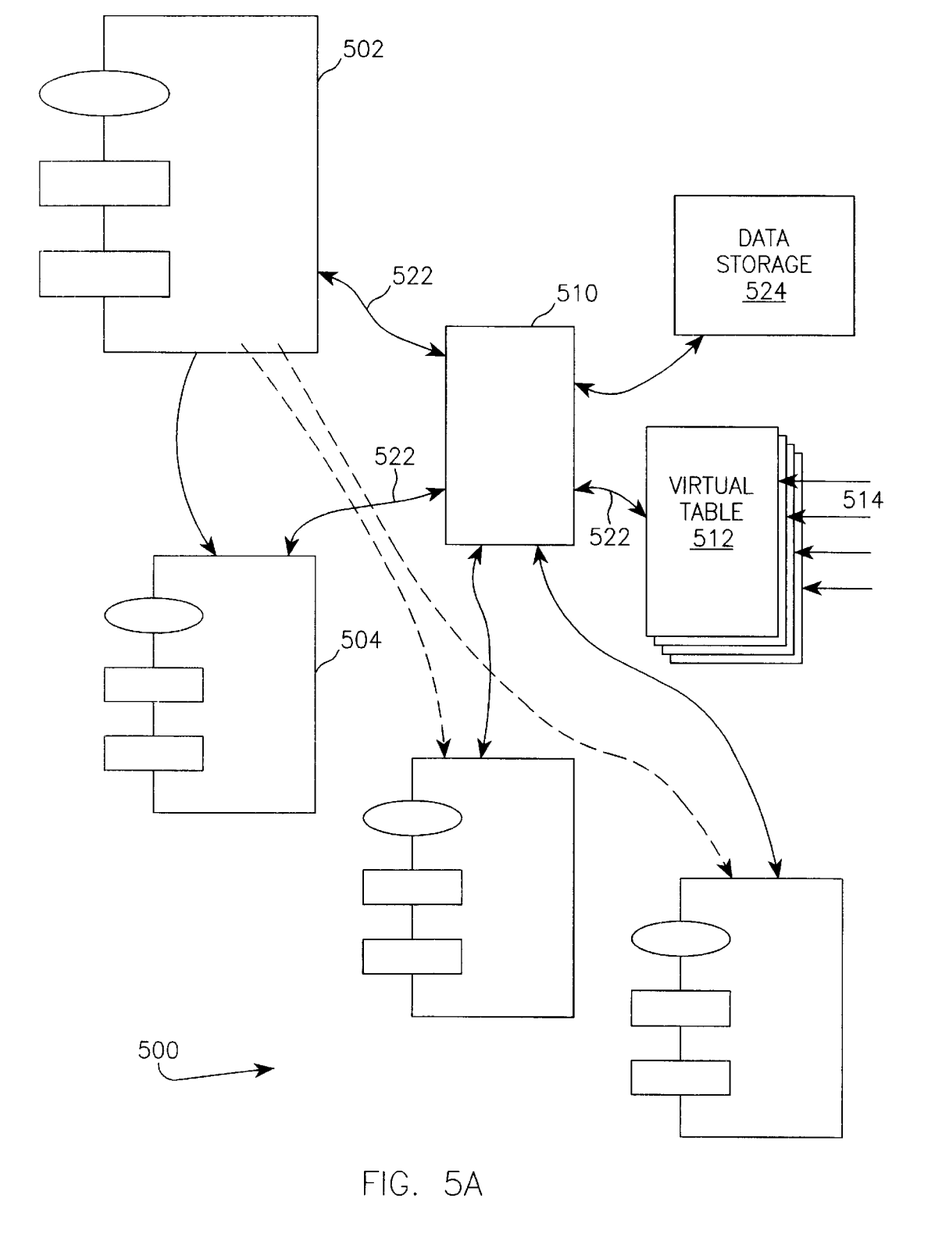
FIGS. 5A and 5B are, respectively, a module diagram and a class hierarchy diagram which illustrate the physical structure of the software system including a plurality of independent modules arranged in a hierarchy which includes one or more parent processes.

Referring to FIG. 5A, a module diagram illustrates the physical structure of the software system 200 including a plurality of independent modules 500 arranged in a hierarchy which includes one or more parent processes, although the illustrative software system 200 includes only a single parent process 502 and one or more child processes 504. A module is a unit of program code that serves as a building block for the physical structure of a system. A module contains declarations that form a physical realization of some or all of the classes and objects included in the logical design of the system. In a parent/child relationship, information is passed from one generation to the next. In particular, the parent process 502 operates on older information to create new information operated on by a child process 504. The modules 500 mutually interact through an interface 510 that is created in an object-oriented language, such as C++. In one embodiment, each individual module includes a C++ interface, although other portions of the module may be developed in other languages, such as assembler, C, Pascal and the like. All modules 500 are independent as each individual module is independently operable, not requiring the linking of any other module to be functional in the software system 200.

The parent process 502 performs basic operations including loading and unloading one or more child processes 504 and initiating communication between loaded child processes 504 including setting up communication structures. Child processes 504 create objects that are used for data storage and complete the communication structure. A function of a process that creates an object is termed a "constructor". This communication structure achieves bidirectional communication between parent process 502 and child processes 504 using object-oriented language constructs, such as an adaptation of C++ virtual language features. The virtual function features advantageously resolve addresses of functions at run time rather than at link time so that the software system 200 is freely configurable to furnish a versatile functionality. In a system that does not incorporate virtual functions, a compiler generates a name reference for a particular external function that is resolved at link time by necessarily linking software modules with the particular software module that implements the named external function. In contrast, a system that utilizes virtual functions implements each virtual function by designating a position in a table to that function. During compilation of the software system 200 which utilizes virtual functions, when a virtual function that is part of a particular defined class is encountered, a compiler (not shown) inserts a code that references an offset into a virtual table 512. The virtual table 512 establishes the communication structure, rather than designating a particular actual function name. When an object that contains a virtual function is created, the compiler inserts a program code which constructs the virtual table 512 into a module 500, thereby implementing the particular virtual function. One virtual table 512 is constructed for each defined class.

In the software system 200, the interface 510 operates through the virtual table 512 for each class. The virtual table 512 is a simple list of pointers, each pointing to a particular virtual function. All objects of a defined class share the same virtual table 512 so that the compiler establishes only a single link between each additional object and the virtual table 512. Using this technique, a module having a pointer to an object of a particular class advantageously has access to the functions within that class without having to be physically linked with the module that contains the implementation of the class.

Virtual functions are conventionally used to implement polymorphism, a concept by which a message is interpreted differently when received by different objects so that the similar objects respond differently to the same message. The polymorphism concept is typically used by a class that is derived from a parent class to override functions that exist in the parent class.

In the present software system 200, the concept of polymorphism is modified to facilitate communication between software modules by supplying the interface 510 between the parent process 502 and a child process 504. Communication between modules 500 is established using a constructor function of the parent process 502 to create an object that describes the functions that any child process 504 can access. The parent process 502 associates the created object to the child process 504 by passing a pointer 514 designating the object to the child process 504. The child process 504 thus gains the ability to access functions in the parent process 502 by using the virtual table 512. A constructor function of the child process 504 completes a communication path 522 by creating an object of an appropriate class and calling back into the parent process 502 to pass the pointer 514 to the object. Once the communication path 522 is completed, the parent process 502 has access to the functions in the child process 504 using the virtual function concept via the virtual table 512. In this manner communication is advantageously established between independent modules despite neither the parent process 502 nor the child process 504 having any program code made accessible by linking of the other module's class implementation.

As the software system 200 operates over time, the parent process 502 loads and unloads a child process 504 as needed. The parent process 502 controls allocation of memory in the processor so that the parent process 502 can retain objects and virtual tables 512 associated with the objects 504 while discarding the child process 504 which contains the implementation of the classes. The objects and virtual tables 512 that persist despite the discarding of the child process 504 that created the objects and virtual tables 512 are said to have the property of persistence. Persistence is the property of an object by which the existence of the object transcends the existence of the process which creates the object. Thus a persistent object persists even though the creator, the child process 504 which created the object, ceases to exist. The child process 504 functions contain the implementation of the child's classes. When the parent process 502 subsequently is to access a function of the child process 504, the parent process 502 simply reloads the child process 504 program code that contains the function. The child process 504 is reloaded into the same locations in memory as originally loaded since the virtual table 512 that is part of the class object contains pointers into the child module 504. Various object-oriented language systems use different techniques, as are known in the computing arts, for reloading a child module into the memory location at the position of initial loading.

The software system 200 creates persistent and sharable data storage 524 for a child process 504 simply by adding data elements to the class object that describes the virtual functions belonging to the child process 504. The object is made persistent by having the child process 504 designate the object to the parent process 502. Functions of the child process 504 are granted access to data in the data storage 524 using a "this" pointer, that is defined by C++ standard. When a function inside a class definition is referenced, the compiler automatically generates program code that creates the "this" pointer that is passed to the module 500. The "this" pointer grants the child process 504 access to the object and thus to the persistent data. The persistent data areas are accessed by multiple independent modules to share without conflict.

Module independence is advantageously achieved using the virtual table technique for communication between modules since modules no longer must be linked. The usage of independent modules is highly advantageous for many reasons. One advantage is that multiple modules may be developed simultaneously with design and development tasks distributed among multiple software engineers. Another advantage is that maintenance is reduced because changes to a module are isolated to that particular module and do not require updating of other modules in the software system 200. Furthermore, testing is simplified since each module may be tested independently of other modules in the system. The independence among modules also improves reliability by avoiding unexpected interactions between functions of different modules. In addition, the software system 200 is easily extensible since programs may be extended simply by adding new independent modules that implement desired functionality. Multiple independent modules may use a single function independently so that code reuse is advantageously promoted using the virtual table technique.

Figure 5B:
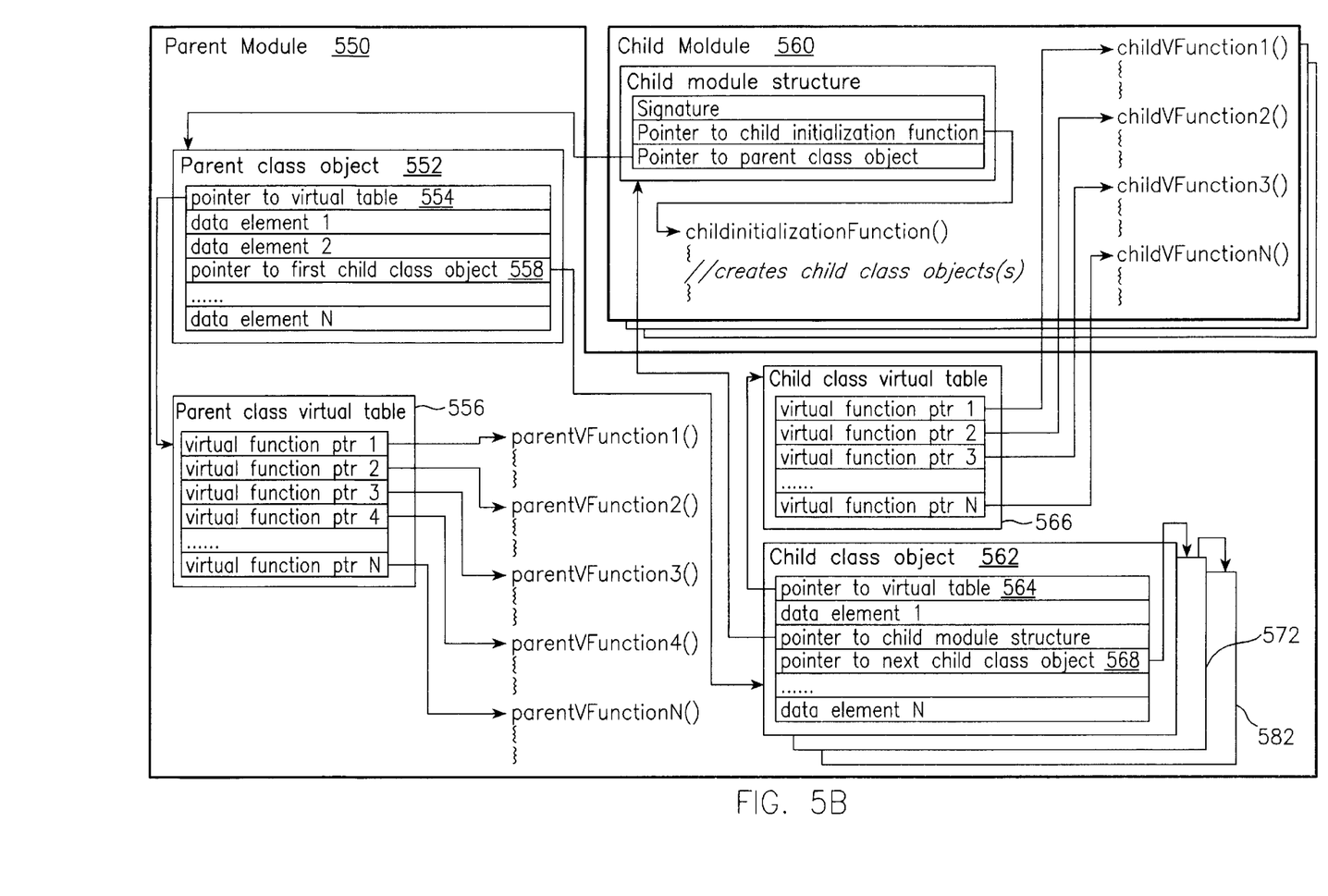

Referring to FIG. 5B, a class hierarchy diagram illustrates the interactions of parent module 550 and a child module 560. The parent module 550 includes a parent class object 552 and a plurality of child class objects 562, 572 and 582. The parent class object 552 has a pointer 554 to a parent class virtual table 556 and a pointer 558 to the child class object 562. The child class object 562 has a pointer 564 to a child class virtual table 566, a pointer to the child module 560 and a pointer 568 to the child class object 562. Each subsequent child class object 572 and 582 has a pointer (not shown) to an associated child class virtual table (not shown), a pointer to an associated child module and a pointer (not shown) to a subsequent child class object. The subsequent child class objects 572 and 582 may include a pointer to the child module 560 or a pointer to another child module (not shown). The child class virtual table 566 includes a plurality of pointers to functions in the child module 560. The child module 560 has pointer to the parent class object 552.

Figure 6:
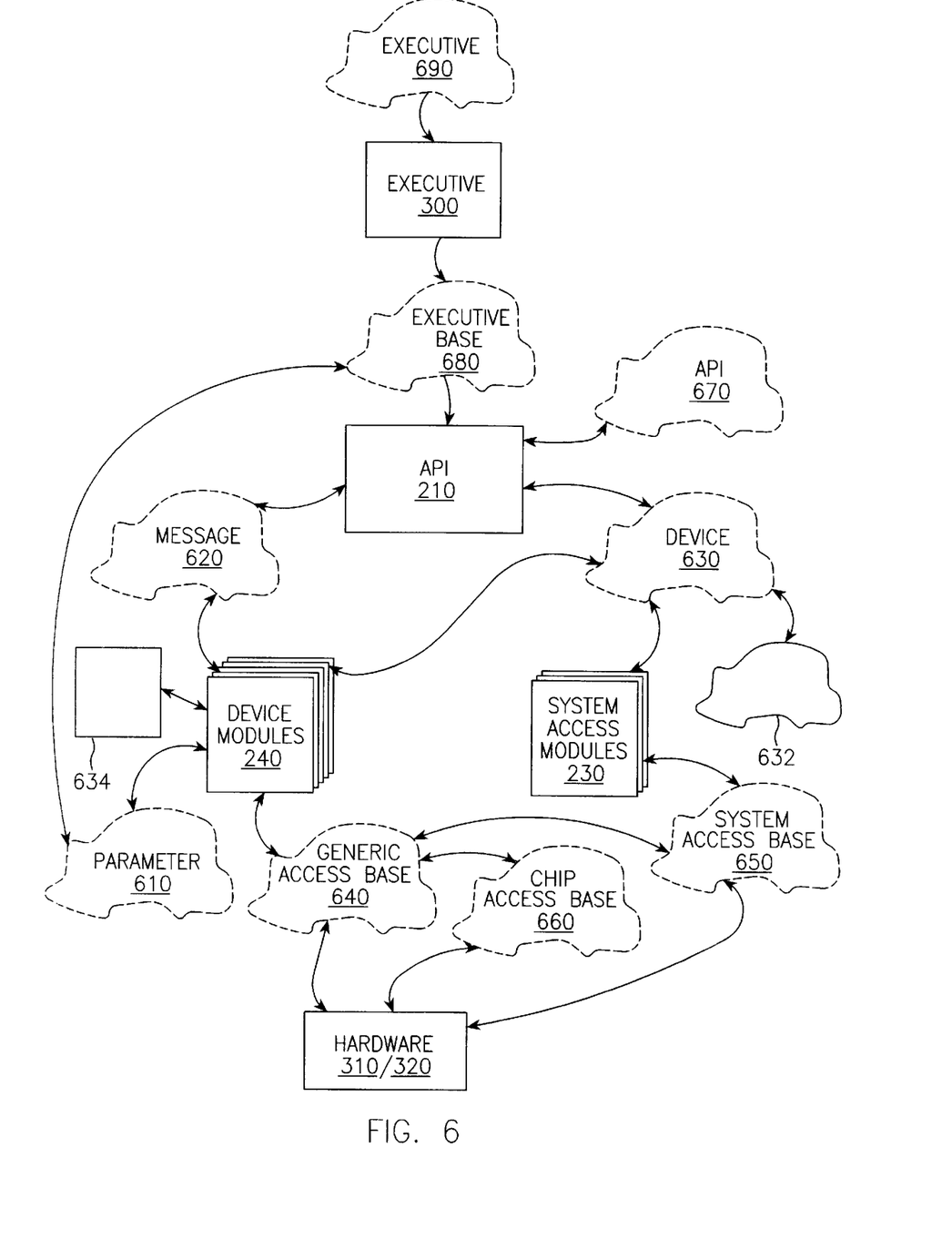
FIG. 6 is a class diagram which illustrates existing classes and the relationships of the classes in the logical design of the software system.

Referring to FIG. 6, a class diagram illustrates existing classes and the relationships of the classes in the logical design of the software system 200. The classes that are generated for usage by the software system 200 include a parameter class 610, a message class 620, a device class 630, a generic access base class 640, a system access base class 650, a chip access base class 660, an API class 670, an executive base class 680, an executive 690 and a test class (not shown).

Referring to the class diagram shown in FIG. 6 in conjunction with procedures performed in accordance with the flow chart shown in FIG. 4, the parameter class 610 is described as a base class from which parameter classes are derived. The parameter classes are used by the device modules 330 to define user-modifiable parameters. After a device module 330 has been detected by the API constructor in step 412 and the API 210 has instantiated a device class in step 426, the device module 330 instantiates one parameter class 610 for each changeable parameter. The parameter classes 610 are subsequently attached to the device class 630 during instantiation of the parameter class 610 by the constructor. The executive 300 uses the parameter classes 610 to prompt a user to change parameters.

The message class 620 furnishes an interface between device modules 330 or system modules 340 into routines in the API 210.

The device class 630 is an abstract class, a class having no instances. Various modules instantiate a class derived from the abstract device class for every device that is detected. A constructor for the device class inserts a new instance of the device class into a sorted linked list of devices. The device list is sorted in ascending order according to a "device type" member of the list. Because the device class is an abstract class, a constructor of the device class derives a new class. The new classes are type specific and usually contain elements such as device-specific configuration information.

The device modules 330 include one or more physical devices 634 which are each represented by a software object 632 derived from a common base device class 630. In various embodiments of the software system 200, all physical devices 634 in the software system 200 are represented by software objects 632 that are derived from a common base class, such as device class 630, whether the object is derived directly or indirectly via another device class. The common base class allows the device object to be manipulated at a high level, such as the user interface, the executive 300. In various embodiments, the common base class includes member objects including, for example, device category, character strings that are descriptive of the physical device, identifiers of a support module that handle the device, and link elements for chaining the device object with other device objects. A member object is a repository for part of the state of an object. The combination of the object and the member objects of the object constitute the structure of the object. A member function is an operation upon an object for operations that are defined as part of the declaration of a class. All member functions are operations but not all operations are member functions.

The generic access base class 640 is an abstract class that is a base class for generic access classes. The generic access classes are used by the device modules 330 to access computer hardware in a generic manner. In one embodiment of the software system 200, the general access base classes 640 either access "AT compatible" hardware directly or call the system access base classes 650 to access specific, non-AT compatible hardware such as cache/memory controllers, ECP parallel ports, CPUs and the like.

The system access base class 650 is an abstract class that is one of the base classes for system access classes. The system access classes are access classes that are used by the "generic" device access classes to access system-specific or chip-specific functions. A system module instantiates the system access classes at load time.

The chip access base class 660 is an abstract class that is one of the base classes for system access classes. The system access classes are access classes that are used by the "generic" device access classes to access system-specific or chip-specific functions. A system module instantiates the system access classes at load time.

The API class 670 controls maintenance functions for the software system 200. The maintenance functions include finding and loading of device modules, controlling memory allocations, and performing cleanup of device modules. Maintenance functions also include task switching between the executive and device modules and unloading of device modules. The API class 670 is instantiated only by an executive base constructor.

The executive base class 680 is an abstract class that furnishes an interface between the executive program 300 and the modules. Only one instance of a class derived from the executive base class 680 is allowed. A constructor of the executive class sequences through, finds and loads the module files that match a file mask which designates member files of the software system 200, calling a module initialization function for each module as the module is loaded. Once the constructor has complete operation, a sorted linked list of all devices found by all of the modules is left in memory for access using the executive class.

The executive class 690 is derived from the executive base class 680 and furnishes member functions including display progress, display message, display prompt, display status, display error, and display configuration functions. These functions are called by device modules 330 via the executive base class 680. A constructor for the executive class 690 does no more than merely call the constructor for the executive base class 690. Only one instance of the executive class 690 may exist at one time, a rule that is enforced by the constructor for the executive base class 680. Once an instance of the executive class 690 is removed using a delete operator, another instance may be created.

Figure 7:
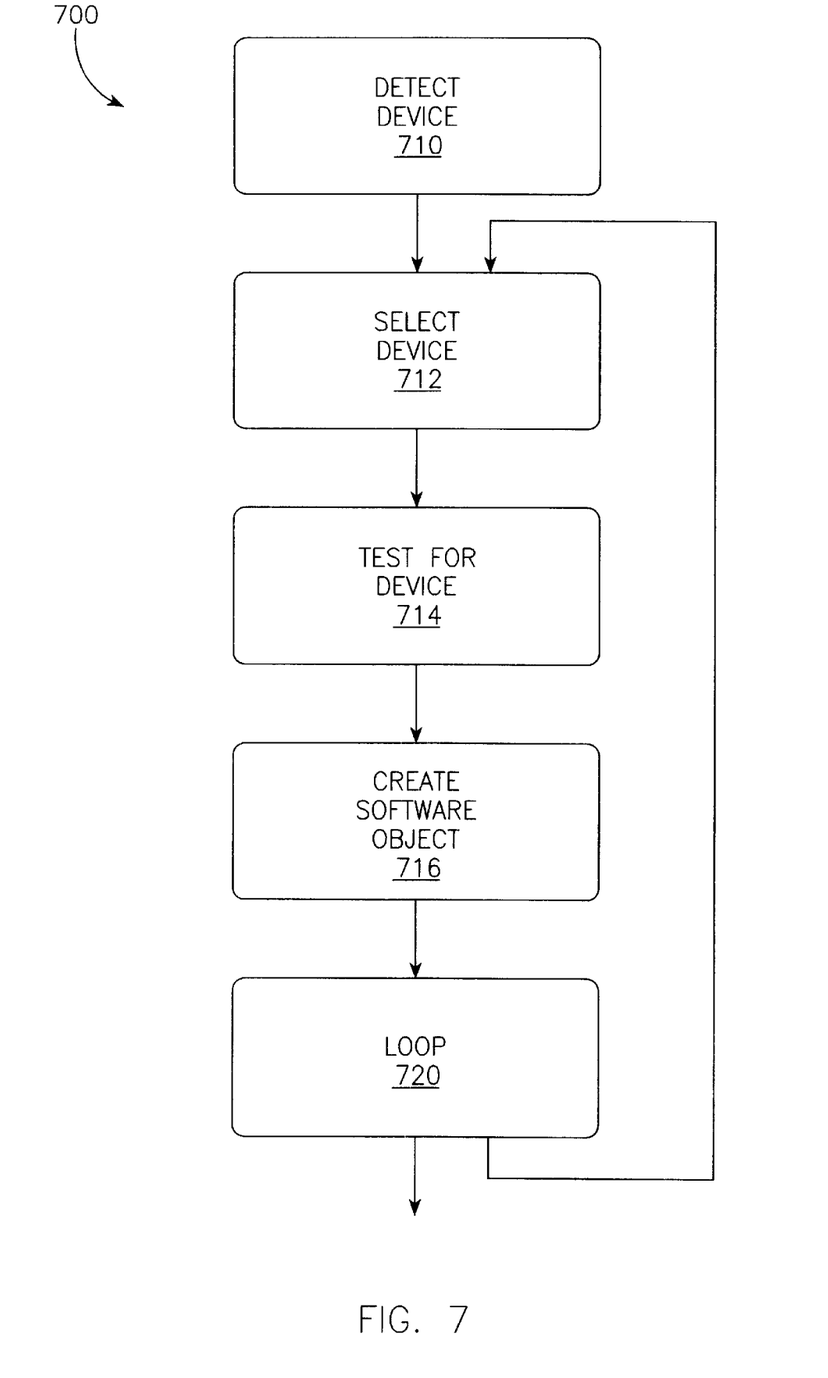
FIG. 7 is a flowchart which illustrates operations of the software system during initialization.

Referring to FIG. 7 in conjunction with FIG. 6, a flow chart shows steps of an initialization process 700 applied to the software system 220. Device detection 710 is one of the functions that is typically performed during software program initialization 700. In select device step 712 a support module 230 or 240 is designated for detection of a physical device. In test for device step 714, a designated support module 230 or 240 attempts to detect devices that are detectable by that particular module. If a device is detected, a software object is created representing the detected physical device in create software object step 716. In loop step 720, the initialization process 700 loops back to step 712 to attempt to detect other devices. Within the loop including steps 712, 714, 716 and 720, control is passed among the various support modules 230 and 240 by the executive 300. As program control is granted to each support module 230 and 240, the support module includes a list of previously designated physical devices that is set to include all devices recognized by the module. The storage module also includes a storage containing information delineating details of detecting and accessing of a particular physical device type. In some support module embodiments, to facilitate creation of additional software objects a single area is defined for all storage modules for storing information for detecting and accessing a device. In some support module embodiments, the storage format for storing important device information is confined to the class that implements a device and may be changed independently from other device storage formats so that changes associated with a particular physical device do not impact the remainder of the software system 200.

A support module and physical device are associated to create a software object that represents the physical device. The various support module/physical device combinations are substantially independent. This independence is highly advantageous to allow a vendor, manufacturer or supplier to deliver a device class via a support module that easily integrates into the software system 200.

As devices are discovered in test for device step 714, the support module 230 or 240, in create software object step 716, creates a software object of an appropriate derived class to represent a physical device. Create software object step 716 supplies information for controlling the device to a table within the support module. In addition a device characteristics storage (not shown) within a software object is created and updated so that device characteristics are encapsulated within the object. Software objects are created only for physical devices that exist and are connected to the software system 200, thus advantageously conserving programming resources.

For a system configuration in which multiple physical devices of the same type are implemented in the software system 200, a single support module 230 or 240 instantiates multiple software objects, one for each of the multiple physical devices in the class defined by the support module. The class definition supplied by the information table within a support module holds previously recorded information including, for example, port addresses or interrupt vectors that differentiate physical devices within the class.

In some embodiments of the software system 200, the newly created software object is passed to the executive 300 in create software object step 716 to add the device to a common device list. The executive 300 references the objects using the base class definition and thus supports any new devices as long as the devices are derived from the common base class. The common device list of the user interface is updated automatically upon connection of the associated support module, without intervention from the user interface. Because all information for creating new device classes and instantiating new software objects representing new physical devices is supplied by a support module, the user interface automatically expands, without intervention by a user, to support an expanding system.

A new physical device is supported by deriving a new associated class and supplying a support module implementing the class. In some circumstances, a new device may simply be a new grouping of existing devices so that much of the support module code for handling the new class exists.

Once the common device list is obtained, the executive 300 uses the list to subsequently make program decisions. The executive 300 also controls the portions of the common device list that are accessible to the user. The executive 300 calls common functions that are defined in the base class, including functions that obtain the configuration of the device and functions that use the data to create displays for user viewing.

While the invention has been described with reference to various embodiments, it will be understood that these embodiments are illustrative and that the scope of the invention is not limited to them. Many variations, modifications, additions and improvements of the embodiments described are possible.

What is claimed is:

1. A diagnostic system operating on a processor the diagnostic system comprising:
   a base class operating on the processor the base class being a generic class that serves as a template for other classes;
   a plurality of physical devices coupled to the processor;

a plurality of device classes derived from the base class, a device class of the plurality of device classes having a device class characteristic definition distinguishing the device class from other device classes; and a plurality of diagnostic device objects, a diagnostic device object of the plurality of diagnostic device objects being derived from a base class and having an encapsulated device characteristic definition corresponding to physical characteristics of the physical device so that the diagnostic device object is associated with the device via a device class associated with the diagnostic device object of the plurality of device classes, the plurality of diagnostic device objects respectively corresponding one-to-one to the plurality of physical devices.

2. A diagnostic system according to claim 1, wherein:

a device class of the plurality of device classes defines a storage format for a diagnostic device object associated with the device class, the defined storage format being modifiable independently of other device classes.

3. A diagnostic system according to claim 1, wherein:

each diagnostic device object of the plurality of diagnostic device objects includes a defined storage format including a designated storage storing information for detecting and accessing the physical device corresponding to the diagnostic device object.

4. A diagnostic system according to claim 1, further comprising:

a plurality of physical devices of a like physical type coupled to the processor; and a plurality of diagnostic device objects, a diagnostic device object of the plurality of diagnostic device objects being an instantiation of the device class and having a device characteristic definition including information that mutually distinguishes the individual diagnostic device objects.

5. A diagnostic system according to claim 4, wherein the device characteristic definition information that mutually distinguishes the individual diagnostic device objects is selected from information including a physical device port address and an interrupt vector.

6. A diagnostic system according to claim 1, further comprising:

a user interface operating on the processor, the user interface including a plurality of functions for manipulating the diagnostic device object.

7. A diagnostic system according to claim 1, further comprising:

a message class derived from the base class and supplying a message interface between the user interface and the diagnostic device object.

8. A diagnostic system according to claim 1, further comprising:

a generic access class derived from the base class and having a device class characteristic definition for accessing the physical device in a generic manner.

9. A diagnostic system according to claim 1, further comprising:

a system access class derived from the base class and having a device class characteristic definition for accessing the physical device in a system-specific manner.

10. A diagnostic system according to claim 1, further comprising:

a chip access class derived from the base class and having a device class characteristic definition for accessing the physical device in a chip-specific manner.

11. A diagnostic system according to claim 1, further comprising:

a parameter class derived from the base class and defining user-modifiable parameters corresponding to the physical characteristics of the physical device.

12. A diagnostic system operating on a processor and having a storage, the diagnostic system comprising:

a physical device coupled to the processor;

a process operating on the processor including:
   a constructor for creating processes classes objects and pointers;
   a loader function for loading processes classes and objects from the storage; and
   an unloader function for unloading processes and objects from the storage;

a diagnostic device object derived from creation by the process and having a device characteristic function corresponding to physical characteristics of the physical device so that the diagnostic device object is associated with the physical device; and a virtual function interface including:
   a first pointer created by the process and passed by the process to the diagnostic device object and designating a function to the diagnostic device object; and
   a second pointer created by the diagnostic device object and passed from the diagnostic device object to the process.

13. A method of performing a diagnostic operation relating to a physical device in a computing system, the method comprising the steps of:

creating a generic base class;

deriving a software object from a generic base class;

representing the physical device as the derived software object;

detecting a physical device the detecting step including the substeps of:
   providing in the generic base class a plurality of device type support functions for each respective device class of a plurality of device classes, a device class supporting a specific type of physical device of a plurality of specific types of physical devices;
   in a generic base class function looping through the plurality of device type support functions;
   in the device type support functions detecting whether a physical device of the type supported by the device type support function is connected to the computing system; and responsive to detection of a supported device type, creating a software object for representing the detected physical device.

14. A method according to claim 13, further comprising the step of:

encapsulating a plurality of device characteristics of the physical device within the software object.

15. A method according to claim 14, further comprising the step of:

defining a specific selected device characteristic of the plurality of device characteristics as a region containing information relating to detection and accessing of the physical device.

16. A method according to claim 13, further comprising the step of: deriving a device class relating to a specific physical device type from the generic base class.

17. A method according to claim 16, further comprising the step of:

incorporating an additional physical device of a particular physical device type by making an instantiation of the device class relating to the specific type of physical device.

18. A method according to claim 13, further comprising the step of: deriving a plurality of device classes from the generic base class.

19. A method according to claim 18, further comprising the step of:

defining for a particular selected device class of the plurality of device classes a storage format of a device characteristic region the device characteristic region containing information relating to detection and accessing of the physical device, the defined storage format being independent of the storage format of other classes.

20. A method according to claim 13, wherein the generic base class includes a member function that is selected from a group of member functions including a device category, a character string that describes a device, a designation of a software module that controls a physical device and a link element for chaining a software object with other software objects.

21. A method according to claim 13, further comprising the step of:

designating the software object representing the detected physical device on a device list.

22. A computer program product comprising:

a computer usable medium having computable readable code embodied therein the code including a diagnostic system operating on a processor and having a storage the processor being coupled to a physical device, the diagnostic system including:

a process operating on the processor including:
a constructor for creating processes, classes, objects and pointers;
a loader function for loading processes, classes and objects from the storage; and
an unloader function for unloading processes and objects from the storage;

a diagnostic device object derived from creation by the process and having a device characteristic function corresponding to physical characteristics of the physical device so that the diagnostic device object is associated with the physical device; and a virtual function interface including:
a first pointer created by the process and passed by the process to the diagnostic device object and designating a function to the diagnostic device object; and
a second pointer created by the diagnostic device object and passed from the diagnostic device object to the process.

23. A computer program product comprising:

a computer usable medium having computable readable code embodied therein executing a diagnostic operation relating to a physical device in a computing system, the diagnostic operation including a plurality of routines performing the operations of:

creating a generic base class;

deriving a software object from a generic base class;

representing the physical device as the derived software object;

detecting a physical device, the detecting step including the substeps of:
providing in the generic base class a plurality of device type support functions for each respective device class of a plurality of device classes, a device class supporting a specific type of physical device of a plurality of specific types of physical devices;
in a generic base class function, looping through the plurality of device type support functions;
in the device type support functions, detecting whether a physical device of the type supported by the device type support function is connected to the computing system; and
responsive to detection of a supported device type, creating a software object for representing the detected physical device.

* * * * *